United States Patent [19]

Grubka

[11] Patent Number: 4,478,625

[45] Date of Patent: Oct. 23, 1984

[54] APPARATUS FOR PRODUCING AND COLLECTING GLASS FIBERS

[75] Inventor: Lawrence J. Grubka, Heath, Ohio

[73] Assignee: Owens-Corning Fiberglas Corporation, Toledo, Ohio

[21] Appl. No.: 450,818

[22] Filed: Dec. 20, 1982

[51] Int. Cl.³ .............................................. C03B 37/12
[52] U.S. Cl. .......................................... 65/11.1; 65/2; 65/3.1; 65/10.1; 34/24; 34/224
[58] Field of Search .................... 65/2, 3.1, 10.1, 11.1; 34/16, 18, 24, 224

[56] References Cited

U.S. PATENT DOCUMENTS

| | | | |
|---|---|---|---|
| 2,804,693 | 9/1957 | Brodie | 34/18 |
| 3,340,617 | 9/1967 | Carroll | 34/18 |
| 3,851,453 | 12/1974 | Roberson | 65/2 X |
| 4,088,468 | 5/1978 | Roberson | 65/3.1 |
| 4,218,830 | 8/1980 | Grassmann | 34/1 |

Primary Examiner—Robert L. Lindsay, Jr.
Attorney, Agent, or Firm—Ronald C. Hudgens; Philip R. Cloutier; Greg Dziegielewski

[57] ABSTRACT

Apparatus for producing and collecting continuous glass filaments is provided comprising: feeder means for supplying a plurality of streams of molten glass to be drawn into filaments; means for applying a liquid to said filaments; a rotatable member adapted to wind said filaments in layers therearound and to draw said streams into said filaments; distribution means for supplying a plurality of streams of gas to at least partially dry the filaments wound around said member, said streams being directed into contact with the layers along the length thereof and over a portion of the arcuate periphery of the layers; and collection means for removing the moisture containing air from around the periphery of said layers of filaments, said collection means extending along the length of said layers and over a portion of the arcuate periphery of the layers.

6 Claims, 4 Drawing Figures

U.S. Patent     Oct. 23, 1984     4,478,625 ially 4,478,625

APPARATUS FOR PRODUCING AND COLLECTING GLASS FIBERS

TECHNICAL FIELD

The invention disclosed herein relates to apparatus for producing and collecting continuous glass filaments comprising feeder means for supplying a plurality of streams of molten glass to be drawn into filaments; means for applying a liquid to said filaments; a rotatable member adapted to wind said filaments in layers therearound and to draw said streams into said filaments; distribution means for supplying a plurality of streams of gas to at least partially dry the filaments wound around said member, said streams being directed into contact with the layers along the length thereof and over a portion of the arcuate periphery of the layers; and collection means for removing the moisture containing air from around the periphery of said layers of filaments, said collection means extending along the length of the layers and over a portion of the arcuate periphery of the layers.

BACKGROUND ART

In the production of glass filaments, the newly drawn filaments are coated with a liquid sizing to coat and protect the individual filaments. The sizing is usually aqueous-based and is dried in an intermediate processing step. Historically, such strands of continuous filaments are helically wound into packages of wet strand which are subsequently dried or cured in an oven to remove a suitable amount of the moisture or solvent from the sizing material.

Attempts have been made to dry the strand as it is being collected at the winder, or prior thereto, to assist in drying the package to reduce the time spent in such ovens, or even obviate the need for the ovens. Such attempts have included the use of high frequency dielectric systems for drying the strand. The present invention provides a relatively simple, effective system for drying the advancing strand as it is being wound into a package.

DISCLOSURE OF THE INVENTION

The present invention encompasses a system for at least partially drying the strand at the package collection region comprising a heated air distribution system that conforms to the arcuate periphery of the package over a substantial portion thereof to provide a concentrated set of gaseous streams to contact and dry the layers of strand as the package is being formed. Further, a collection system is provided around the distribution system to remove the moisture laden air from the package collection region.

BRIEF DESCRIPTION OF THE DRAWINGS

FIG. 2 is an enlarged view of the air collection system shown in FIG. 1.

BEST MODE OF CARRYING OUT THE INVENTION

Figure 1:
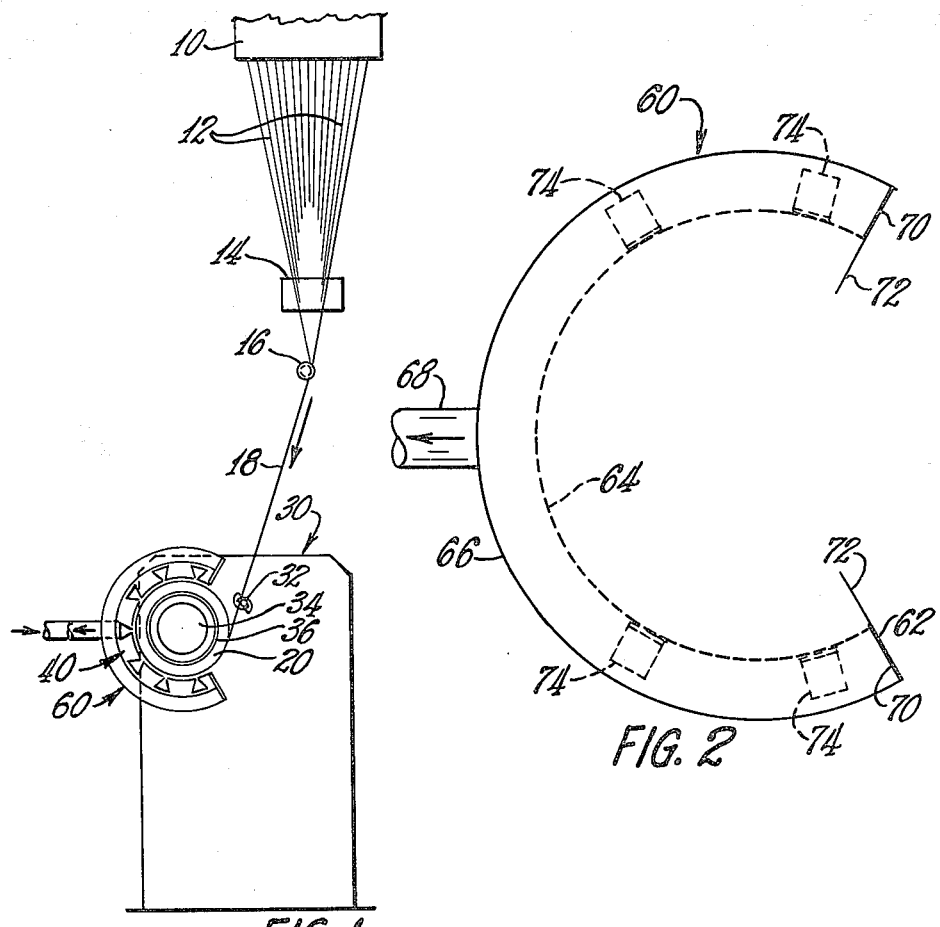
FIG. 1 is a semi-schematic elevational view of a glass fiber forming system according to the principles of this invention.

As shown in FIG. 1, feeder 10 supplies a plurality of streams of molten inorganic material, such as glass, which are drawn into filaments 12 through the action of winder 30. Size or coating applicator means 14 is adapted to apply a liquid coating or sizing to the advancing filaments 12. Such sizings are usually aqueous based, but they may be of any suitable type. Subsequently, filaments 12 are gathered into a strand 18 at gathering shoe or means 16.

Strand 18 is then wound into package 20 on driven, rotatable member or collet 34 of winder 30. As is known in the art, a sleeve or tube 36 may be provided on collet 34 upon which to wind strand 18. Winder 30 also includes a transversing mechanism 32, such as spiral wire, to distribute the strand 18 along the length of the package collection region of collet 34 to deposit the strand in helically wound layers.

Figure 3:
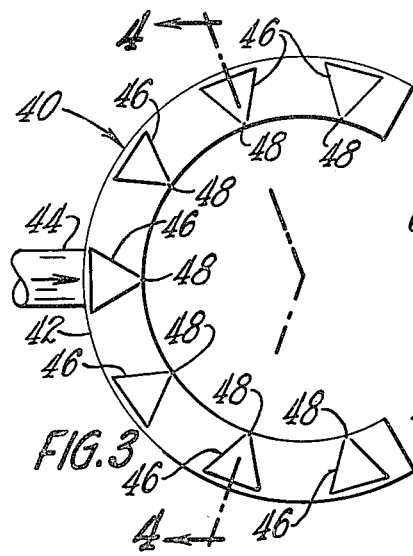
FIG. 3 is an enlarged view of the heated air distribution system shown in FIG. 1.

As shown in FIGS. 1 and 3, distribution means 40 supplies a body of flowing gas in the form of a plurality of streams of heated gas, such as air, to at least partially dry the coated filaments being wound around collet 34. The streams of heated air are directed inwardly to contact the layers of strand along the length of the package over a large portion of the arcuate periphery of the package being formed.

Distribution means 40 is comprised of a hollow housing or collar 42 having a plurality of laterally extending fingers 46 extending along the axis of rotation of collet 34, preferably over substantially the entire length of the package collection region thereof. Each of the fingers 46 has an orifice 48 disposed toward the package collection region to direct a stream of air, preferably heated, to dry or cure the sizing material as the strand is being wound on the rotating member 34. Such orifices 48 may be single slot extending the length of the package collection region or a plurality of closely spaced holes positioned along the length of the package collection region or layer of strand.

Preferably, the streams of air are directed into contact with the outer layer of strand of the package at a volume and velocity sufficient to penetrate the boundary layer of air adhering to the rotating package periphery. Housing 42 is provided with an inlet means 44 which is connected to a suitable source of air (not shown) which is preferably adapted to heat the air to a predetermined temperature. To evacuate the moisture-ladened air from around the package 20, an air collection means 60 is provided around distribution means 40 between and collet 34.

Collection means 60 is comprised of a C-shaped body or enclosure 62 as shown in FIG. 2. Body 62 is comprised of a foraminous inner surface 64 and an outer cover 66 spaced from inner surface 64.

Outer cover 66 includes sides 67 which extend inwardly to join inner surface 64 to form a toroidally shaped chamber. Exhaust 68, which is joined to cover 66, provides communication between a suitable source of vacuum (not shown) and the chamber within body 62 to withdraw the moisture or vapor-ladened air from the package collection region around the collet.

As shown in FIG. 2, ends 70 of body 62 have flexible baffles 72 joined thereto. Baffles 72 extend inwardly toward the package surface to assist in confining the working fluid, that is heated air, to the package formation region. Preferably, each baffle 72 does not contact the layers of strand.

Figure 4:
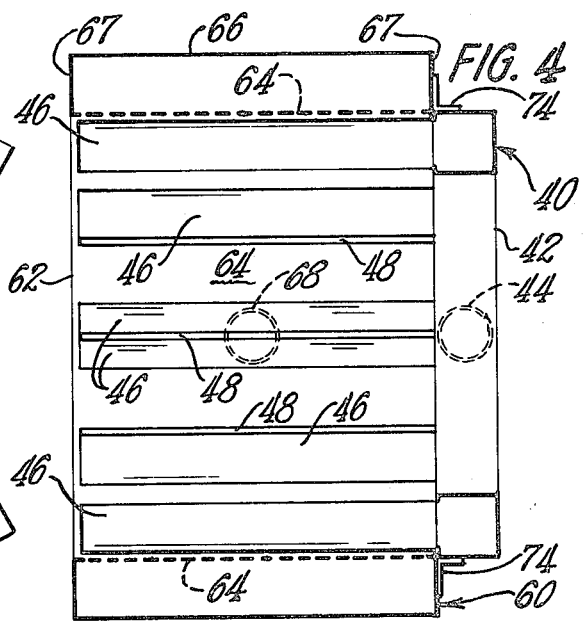
FIG. 4 is an enlarged sectional view of the air distribution and collection systems shown in FIGS. 2 and 3 taken along view 4—4.

As shown in FIG. 4, the fingers 46 of distribution means 40 are nested within collection means 60 along the inner surface 64 thereof. Thus, spaced apart fingers 46 are positioned between the package collection region of collet 34 and the foraminous surface 64 of the air collection system 60. Distribution means 40 and collection means 60 may be suitably joined together to form an integral unit, such as by welding support tab 74 to each. The unit may also be attached to a suitable carriage to be moveable with respect to the axis of rotation of collet 34 to permit access to the package and/or collet as desired.

As shown, the air supply fingers 46 and foraminous inner surface 64 extend around the majority of the arcuate periphery of the layers or package collection region.

Preferably, the fingers 46 positioned at the end of C-shaped housing 42 are spaced far enough apart to permit the distribution means 40 to be withdrawn along a line perpendicular to the axis of rotation of the collet over a full package. Similarly, the ends of foraminous surface 64 should be spaced apart sufficiently to permit the withdrawal of the air collection means laterally from the winder. Baffles 72, if made from a pliable enough elastomer, may be spaced apart less than the distance equal to the diameter of a full package. That is, baffles 72 should be flexible enough to permit withdrawal of the unit even if the package is larger than the spacing between the baffles.

In operation, the orifices 48 of the fingers 46 direct the heated air into contact with the external layer of strand 18 to remove at least a portion of the moisture or liquid from the wet strand. The vapor-ladened air then passes between fingers 46 and through foraminous surface 64 of collection means 60.

It is to be understood that the present invention as shown and described herein may be employed in conjunction with various features as set forth in concurrently filed patent application Ser. No. 450,941, filed on Dec. 20, 1982, in the names of Michael W. Morrison, Clarence E. Fracker, Jr., and Jerome F. Marra which is hereby incorporated by reference.

It is apparent that within the scope of the present invention, modifications and different arrangements can be made other than as herein disclosed. The present disclosure is merely illustrative, with the invention comprehending all variations thereof.

INDUSTRIAL APPLICABILITY

The invention disclosed herein is readily applicable to the formation and collection of continuous glass filaments.

I claim:

1. Apparatus for producing and collecting continuous glass filaments comprising:
    feeder means for supplying a plurality of streams of molten glass to be drawn into filaments;
    means for applying a coating to said filaments;
    a rotatable member adapted to wind said filaments in layers therearound and to draw said streams into said filaments;
    a plurality of spaced apart fingers having an orifice therein to direct a body of gas as a plurality of streams to at least partially dry the coated filaments wound around said member, said gas being directed into contact with the layers along the length thereof and over a portion of the arcuate periphery of the layers; and
    collection means for removing the vapor containing air from around the periphery of said layers of filaments, said collection means being comprised of a housing having an arcuate, foraminous inner surface positioned adjacent said fingers, the orifices of said fingers being located between said layers and said foraminous surface, said foraminous surface extending along the length of said layers and over a portion of the arcuate periphery of the layers.

2. The apparatus of claim 1 wherein said fingers and said collection means extend around a majority of the arcuate periphery of the layers.

3. The apparatus of claim 4 wherein said fingers and collection means are movable with respect to the axis of rotation of said member.

4. The apparatus of claim 1 further comprising a flexible baffle extending from an end of said collection means toward said member to assist in confining the vapor containing air to a zone between the layers and the housing.

5. The apparatus of claim 1 further comprising means for heating the gas to be supplied by said fingers.

6. The apparatus of claim 1 wherein said fingers and said collection means are positioned such that the gas supplied by the fingers contacts the layers and then passes between said fingers and through said foraminous surface.

* * * * *